United States Patent [19]

Marco

[11] 4,168,954
[45] Sep. 25, 1979

[54] TEXTILE MATERIALS HAVING DURABLE SOIL RELEASE AND MOISTURE TRANSPORT CHARACTERISTICS AND PROCESS FOR PRODUCING SAME

[75] Inventor: Francis W. Marco, Pauline, S.C.

[73] Assignee: Milliken Research Corporation, Spartanburg, S.C.

[21] Appl. No.: 863,282

[22] Filed: Dec. 22, 1977

[51] Int. Cl.$^2$ ............................................... D06P 5/00
[52] U.S. Cl. ........................................ 8/18 R; 8/115.6; 8/178 R; 8/179; 8/DIG. 15; 252/8.6
[58] Field of Search ................... 8/18 R, 115.6 A, 91, 8/115.6; 252/DIG. 15

[56] References Cited

U.S. PATENT DOCUMENTS

| | | | |
|---|---|---|---|
| 2,313,076 | 3/1943 | Klinkenstein | 8/3 |
| 3,068,120 | 12/1962 | Jacobson et al. | 8/115.6 A |
| 3,113,674 | 12/1963 | Kiefer et al. | 8/91 |
| 3,407,026 | 10/1968 | Mauldin | 8/115.6 A |
| 3,885,911 | 5/1975 | Habib | 8/115.6 |
| 3,905,762 | 9/1975 | Lehinant et al. | 8/18 |
| 3,928,213 | 12/1975 | Dwight et al. | 252/DIG. 15 |

FOREIGN PATENT DOCUMENTS

| | | | |
|---|---|---|---|
| 2616881 | 11/1976 | Fed. Rep. of Germany | 8/91 |
| 7105276 | 2/1971 | Japan | 8/91 |

OTHER PUBLICATIONS

Porter, B. R., et al., Textile Research Journal, 1957, 27, (No. 11), pp. 833-845.

Goldstein, H. B., et al., Textilveredlung, 1970, 5, (No. 6), pp. 481-486.

*Primary Examiner*—A. Lionel Clingman
*Attorney, Agent, or Firm*—H. William Petry

[57] ABSTRACT

Textile materials formed of polyester or nylon fibers having improved durable soil release characteristics are provided by application to the textile material of at least about 0.001 weight percent of a water-soluble cellulose acetate polymeric constituent having a degree of substitution of the acetyl moiety of from about 0.6 to about 0.9. Such water-soluble cellulose acetate polymeric constituent are represented by the formula

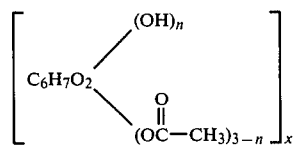

wherein x is an integer of at least 50, n is an integer of from about 2.4 to about 2.1, and the expression 3−n is the degree of substitution of the acetyl moiety. The water-soluble cellulose acetate polymeric constituent can be applied to the fabric from an aqueous pad bath containing the polymeric constituent; by exhaustion techniques during the dyeing of the textile material; or as an aqueous spray.

13 Claims, No Drawings

TEXTILE MATERIALS HAVING DURABLE SOIL RELEASE AND MOISTURE TRANSPORT CHARACTERISTICS AND PROCESS FOR PRODUCING SAME

This invention relates to textile materials formed of polyester or nylon fibers having durable soil release and moisture transport characteristics. In one aspect it relates to a method for imparting durable soil release and moisture transport characteristics to a textile material formed of polyester or nylon fibers.

The genesis of synthetically produced textile fibers has brought about a tremendous effort in the textile industry along numerous avenues. There has been much research effort directed to the improvement of synethetic fibers, especially the polyester fibers, to improve the soil release characteristics of textile materials produced from such fibers without adversely effecting the hand of the textile material. Further, much work has been done to improve such fibers so that redeposition of the soil does not occur during the normal home laundering process. Thus, a major concern has been the difficulty of cleaning garments made from polyester fibers using conventional home washing procedures due to the oleophilic nature of the garments made from the textile materials of polyester fibers. Similarly, problems have been incurred due to the redeposition of soil from the dry cleaning solution on garments made from polyester fibers. Numerous efforts have been proposed to alter the oleophilic properties of the textile materials produced from polyester fibers so that the dirt and/or oily deposits on the soiled clothes can readily be removed by either a home washing procedures or a commercial dry cleaning procedure. However, in altering the oleophilic characteristics of the textile material care must be exercised to insure that the hand of the fabric does not become hard which would result in discomfort to the wearer of the garment.

Numerous attempts have been made to solve the problem of soiling of synthetic fibers and a substantial amount of research has been conducted and numerous polymeric consitutents have been employed in order to provide textile materials produced of synethetic made fibers with desired soil release characteristics and/or anti-redeposition properties. For example, many polymer systems have been proposed which are capable of forming a film around the fibers that constitute the textile material, particularly acid emulsion polymers prepared from organic acids having reactive points of unsaturation. Typical of such acid emulsion polymers and processes employing same is the application of an admixture comprising an amino/plast textile resin, a textile resin catalyst and a synthetic acid emulsion polymer. After application, the resin composition is cured. Numerous other soil release agents and methods for application have also been proposed such as the use of polyethylene glycol esters of terephthalic acid. While improved soil release characteristics of the fabrics treated with such soil release agents are often obtained, problems have, nevertheless, been encountered when the fabric is subjected to dry cleaning processes in that the soil removed from the garment is redeposited on the garment from the dry cleaning solution. Thus, even in view of the above and numerous and other processes and compositions which have heretofore been advanced, research is constantly being conducted to develop new and improved composition and processes which will impart durable soil release characteristics to textile materials containing synethetic fibers.

Accordingly, by virtue of the teachings of the present invention, problems historically present with the use of garments produced from textile materials of polyester or nylon fibers are substantially alleviated and durable soil release characteristics are imparted to the textile materials containing such fibers.

It is therefore an object of the present invention to provide a textile material formed of synthetic fibers with improved soil release properties. Another object of the present invention is to provide a process for imparting a durable soil release characteristic to textile materials formed of polyester or nylon fibers. These and other objects, advantages and features of the present invention will be apparent to those skilled in the art from the reading of the following detailed description of the present invention.

Generally speaking, the present invention is directed to textile materials formed of polyester or nylon fibers having durable soil release characteristics and to a process for producing same. Broadly, such is achieved by applying to a textile material formed of polyester or nylon fibers an effective amount of a water-soluble cellulose acetate polymeric constituent so as to provide at least about 0.001 weight percent of the water-soluble cellulose acetate polymeric constituent on the textile material. The water-soluble cellulose acetate polymeric constituents useful for imparting improved durable soil release characteristics to textile materials containing polyester or nylon fibers are characterized as having a degree of substitution of the acetyl moiety of from about 0.6 to about 0.9 and such constituents are represented by the formula

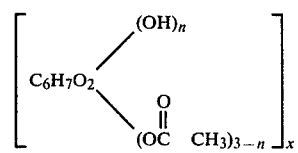

wherein x is an integer of at least 50, n is an integer of from 2.4 to about 2.1 and the expression 3−n is the degree of substitution of the acetyl moiety. The $C_6H_7O_2$ moiety of the above described water-soluble cellulose acetate polymeric constituent is to be understood to be a cyclic ether having as its structural configuration.

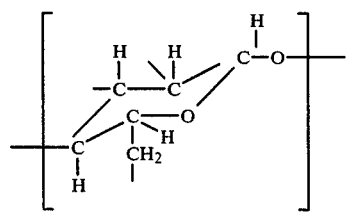

Although any water-soluble cellulose acetate polymeric constituent characterized as above will provide durable soil release and characteristics to the textile material especially desirable results can be obtained when the particular water-soluble cellulose acetate polymeric constituents employed have a degree of substitution of the acetyl moiety as previously described and x is from about 100 to about 200.

The amount of water-soluble cellulose acetate polymeric constituent imparted to the textile material to provide such textile material with durable soil release characteristics can vary widely provided at least about 0.001 weight percent of the water-soluble cellulose acetate polymeric constituent is present on the material. However, desirable results can be obtained when the amount of such water-soluble polymeric constituent present on the textile material is from about 0.001 to about 10 weight percent, more desirably from about 0.05 to about 1 weight percent.

The application of the water-soluble cellulose acetate polymeric constituent to the textile material containing polyester or nylon fibers can be by any suitable method, such as padding, exhaustion, spraying and the like. However, especially desirable results can be obtained when the water-soluble cellulose acetate polymeric constituent is applied to the textile material containing polyester or nylon fibers using either padding techniques, or exhaustion techniques.

One method of application of the cellulose acetate polymeric constituent to the textile material is to first provide an aqueous admixture consisting essentially of water and from about 0.001 to about 10 weight percent of the water-soluble cellulose acetate polymeric constituent. Thereafter, the textile material is contacted or padded with the aqueous admixture so as to provide a resulting wet textile material containing at least about 0.001 weight percent of the water-soluble cellulose acetate polymeric constituent. The resulting wetted textile material containing the desired amount of the water-soluble cellulose acetate polymeric constituent is then dried using any conventional drying technique, such as air drying or passing the wet textile material through an oven, for a period of time effective to remove substantially all of the water and provide a dry textile material containing the before mentioned amount of the water-soluble cellulose acetate polymeric constituent. As previously stated, any suitable drying technique can be provided, the only requirement being that one must exercise care to insure that the temperature at which the wetted textile material is dried does not exceed the decomposition temperature of the water-soluble cellulose acetate polymeric constituent or the fibers from which the material is made. While the amount of the water-soluble cellulose acetate polymeric constituent incorporated onto the textile material can vary widely, provided at least 0.001 percent of said material is applied to the fabric, especially desirable results can be obtained when the textile material contains from about 0.05 to about 1 weight percent of the polymeric constituent.

Once the cellulose acetate polymeric constituent has been applied into the textile material and substantially all of the water has been removed, further processing steps which are well known in the textile industry can be employed, if desirable, such as heat setting, curing, and the like.

In addition to the application of the water-soluble cellulose acetate polymeric constituent by a padding process such as described above, the water-soluble cellulose acetate polymeric constituent can also be applied to textile material formed of polyester or nylon fibers by exhaustion techniques during a high/temperature aqueous dyeing process. However, it should be understood that other dyeing processes in which dispersed dyes are exhausted onto a textile material could also have incorporated therein the desired amount of the water-soluble cellulose acetate polymeric constituent in order to allow exhaustion of such constituent onto the textile material and thereby impart the desired improved durable soil release characteristics to the textile material. Thus, the particular technique employed to conduct the dyeing of the textile substrate and thus the application of the water-soluble cellulose acetate polymeric constituent onto the textile material will vary widely depending upon the particular process employed for exhaustion dyeing, and the application of the water-soluble cellulose acetate polymeric constituent is not critical provided that the water-soluble cellulose acetate polymeric constituent is compatible with the aqueous dye admixture employed and the textile material containing the polyester or nylon fibers is maintained in contact with the aqueous dye admixture containing the cellulose acetate polymeric constituent for a period of time effective to allow exhaustion of the dyestuff and the water-soluble cellulose acetate polymeric constituent onto the textile material from the aqueous dye admixture. Such exhaustion dyeing techniques are well known in the art. However, to further illustrate the subject invention the following exhaustion procedure is set forth.

An aqueous bath is heated to a temperature of from 30 to about 50° C., the aqueous bath containing a suitable surfce active agent, leveler, and other ingredients chosen by the processor. A dispersed dye is then added to the bath and the temperature of the bath is raised to about 60° to 65° C. After the bath has been raised to the desired temperature, the pH of the bath is adjusted to a pH in the range to about 4.0 to 4.5 by the addition of acetic acid. Thereafter, the dyeing machine is sealed and the temperature is again raised to about 130° C. at a rate of about 2° C. per minute. Dyeing is then carried out under pressure for a period of from about 30 to 90 minutes. Once the dyeing cycle has been complete, the dye bath is cooled to a temperature of about 60° to 70° C. before opening and thereafter the material is scoured and rinsed.

When employing such a procedure in conjunction with the method of the present invention wherein a water-soluble cellulose acetate polymeric constituent is incorporated into the aqueous dye bath, the water-soluble cellulose acetate polymeric constituent is introduced in an amount effective to provide at least about 0.001 weight percent of the polymeric constituent on the fabric by exhaustion of the polymeric constituent onto the textile material during the dyeing process. Preferably, the water-soluble cellulose acetate polymeric constituent is added to the aqueous dye bath admixture after the adjustment of the pH of the dye bath with the acetic acid.

The amount of water-soluble cellulose acetate polymeric constituent added to the dye bath can vary widely provided that an effective amount is incorporated into the dye bath to provide at least about 0.001 percent, by weight, of the polymeric constituent on the textile material after the dyeing and exhaustion process is complete. Generally, however, it is desirable that from about 0.01 to about 10 weight percent of the water-soluble cellulose acetate polymeric constituent be incorporated into the dye bath so as to provide such an amount of the polymeric constituent onto the textile material. More desirably, the water-soluble cellulose acetate polymeric constituent is incorporated into the bath in an amount sufficient to provide from about 0.05 to about 1 weight percent of the cellulose acetate polymeric constituent onto the fabric during the dyeing and exhaustion procedure.

After the dyeing and application of the water-soluble cellulose acetate polymeric constituent to the textile material has occurred, the textile material is removed from the pressurized dye bath, and rinsed to remove surface dye and the like. The fabric is then cooled, and dried, such as by air drying or passing the textile material through a drying oven which has been heated to the temperature from about 110° to 120° C. for a period of time effective to remove substantially all of the water from the textile material. When desired, the textile material may be subjected to other processing steps such as heat setting, curing and the like without deleteriously affecting the properties achieved by the application of the water-soluble cellulose acetate polymeric constituent to the textile material.

In the application of the water-soluble cellulose acetate polymeric constituent by the before-described exhaustion procedure, any water-soluble cellulose acetate polymeric constituent having a degree of substitution of the acetyl moiety of from about 0.6 to about 0.9 and represented by the formula

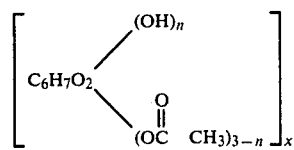

wherein x is an integer of at least about 50, n is an integer of from 2.4 to about 2.1 and the expression 3−n is the degree of substitution of the acetyl moiety can be employed. The $C_6H_7O_2$ moiety of the above described water-soluble cellulose acetate polymeric constituent is to be understood to be a cyclic ether having as its structural configuration

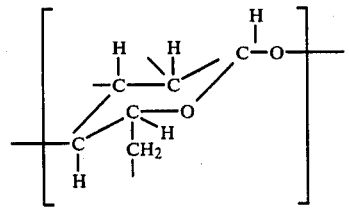

Especially desirable results can be obtained when the water-soluble cellulose acetate polymeric constituent has the before defined degree of substitution of the acetyl moiety and x is an integer of from about 100 to about 200.

In addition to the before-described methods for application of the water-soluble cellulose acetate polymeric constituent to impart improved durable soil release characteristics to textile materials containing polyester or nylon fibers, numerous other methods for application of the water-soluble cellulose acetate polymeric constituent can be envisioned. Thus, such methods of application are not to be deemed limiting to the application of the before-described water-soluble cellulose acetate polymeric constituent to a textile material containing polyester or nylon fibers, but such are merely illustrative of the application of such polymeric constituent to impart the desired properties to such material.

In order to more fully describe the subject invention the following example is given. However, the example is for illustrative purposes only and is not to be construed as unduly limiting the scope of the appended claims. In the example, unless otherwise indicated, all percentages are percentage by weight.

EXAMPLE

An experiment was conducted to determine if a water-soluble cellulose acetate constituent could be exhausted onto a polyester fabric during a simulated dyeing procedure and provide the fabric with the desired soil release characteristics.

A 100% texturized polyester fabric was contacted with an aqueous bath containing 0.05 percent on weight of fiber of a water-soluble cellulose acetate having an acetyl content of 18% (degree of substitution of 0.8). The liquor to fabric ratio of the bath was 10:1.

The polyester fabric and aqueous bath containing the water-soluble cellulose acetate constituent were introduced into a laboratory jet dyeing machine, a sealed container, and the temperature of the aqueous bath was raised to 260° F. During the simulated dyeing process, the bath was agitated. The fabric was maintained in contact with the heated bath for abour 30 minutes after the desired temperature of the bath was obtained. Thereafter, the heat was removed and the bath allowed to cool to 140° F. The polyester fabric was then removed, dried and heat set at a temperature of about 360° F. for about 4 minutes. The dried treated sample was then evaluated for soil release.

A portion of the treated fabric was stained prior to any washing and its soil release characteristics determined.

Other portions of the treated fabric were washed 4 times, 9 times, and 19 times prior to staining and soil release evaluation.

The stain of the samples was accomplished using mineral oil. The washing procedure used in the evaluation of each of the above samples was to subject the samples to a home laundry process and procedure using a standard automatic home washing machine and a standard detergent (AATCC Standard Detergent 124). The washing water temperature was 120° F.

Summarized below are the results obtained from the above-described soil release evaluation.

| Sample | Soil Release Rating of Mineral Oil Stain* Washes Prior to Staining | | | |
| --- | --- | --- | --- | --- |
|  | 0/1 | 4/5 | 9/10 | 19/20 |
| Control (untreated) | 1.5 | 2.3 | 1.8 | 2.3 |
| Treated Sample (0.05 wt % water-soluble acetate, based on weight of fabric, on sample) | 4.3 | 4.5 | 3.8 | 4.5 |

*Ratings employed are determined according to procedure set forth in AATCC Method 130-1974.

A sample of the unstained treated fabric and a sample of unstained control fabric were subjected to a commercial dry cleaning process to determine the effects of the treatment of the sample of fabric on soil redeposition from such a dry cleaning process. The treated sample and control sample were examined visually after same were subjected to the dry cleaning process and the treated fabric sample was found to be much cleaner than the control fabric sample, such indicating the improved anti-redeposition characteristics of the treated fabric sample.

The above data clearly indicated the improved soil release properties imparted to a 100% textured polyester fabric by the application of the water-soluble cellulose acetate polymeric constituent as set forth. Further, it is believed that higher esters of cellulose, such as cellulose propionate and cellulose butyrate, should behave in such a manner provided such higher esters have the desired degree of substitution.

Having thus described the invention, I claim:

1. A process for imparting improved, durable soil release and moisture transport characteristics to a textile material formed of polyester or nylon fibers which comprises applying an effective amount of an aqueous admixture consisting essentially of water and from about 0.001 to about 10 weight percent of a water-soluble cellulose acetate polymeric constituent to provide a resulting wet textile material containing at least about 0.001 weight percent of said water-soluble cellulose acetate polymeric constituent, said cellulose acetate polymeric constituent being characterized as having a degree of substitution of the acetyl moiety of from about 0.6 to about 0.9 and represented by the formula

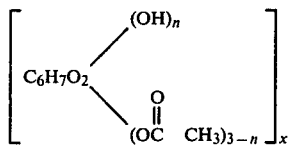

wherein x is an integer of at least about 50, n is an integer of from about 2.4 to about 2.1 and the expression 3−n is the degree of substitution of the acetyl moiety, and drying and resulting wet textile material for a period of time effective to remove substantially all of the water and provide a dry textile material containing said cellulose acetate polymeric constituent.

2. The textile material prepared according to the process of claim 1.

3. The process of claim 1 wherein said water-soluble cellulose acetate polymeric constituent is present in said aqueous admixture in an amount of from about 0.01 to about 10 weight percent and said resulting wet textile material contains from about 0.01 to about 10 weight percent of said polymeric constituent.

4. The textile material prepared according to the process of claim 3.

5. The process of claim 3 wherein said water-soluble cellulose acetate polymeric constituent is present in said aqueous admixture in an amount of from about 0.05 to about 1 weight percent and said resulting wet textile material contains from about 0.05 to about 1 weight percent of said polymeric constituent and x of said formula is from about 100 to about 200.

6. The method of claim 1 wherein said water-soluble cellulose acetate polymeric constituent is applied to the textile material by padding the textile material with said aqueous admixture.

7. A process for imparting improved, durable soil release and moisture transport characteristics to a textile material formed of polyester fibers during a dyeing operation wherein the textile material is contacted with an aqueous dye admixture containing water, a dispersed dyestuff, a minor amount of acetic acid and a leveling agent which comprises incorporating into said aqueous dye admixture a minor effective amount of a water-soluble cellulose acetate polymeric constituent so as to provide at least about 0.001 weight percent of said water-soluble polymeric constituent on said textile material, said water-soluble cellulose acetate polymeric constituent being characterized as having a degree of substitution of the acetyl moiety of from about 0.6 to about 0.9 and represented by the formula

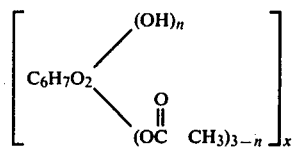

wherein x is an integer of at least about 50, n is an integer of from about 2.4 to about 2.1 and the expression 3−n is the degree of substitution of the acetyl moiety; maintaining said textile material in contact with the dye admixture containing said water-soluble cellulose acetate polymeric constituent under dyeing condition for a period of time effective to allow exhaustion of said dyestuff and said water-soluble cellulose acetate polymeric constituent onto the textile material;

removing the dyed textile material from said dye admixture;

drying the dyed textile material containing the water-soluble cellulose acetate polymeric constituent.

8. The textile material prepared according to the process of claim 7.

9. The process according to claim 7 wherein said water-soluble cellulose acetate polymeric constituent is employed in any amount of from about 0.01 to about 10 weight percent and x of said formula is from about 100 to about 200.

10. The textile material prepared according to the process of claim 9.

11. A textile material formed of polyester fibers having improved durable soil release and moisture transport characteristics consisting essentially of a polyester textile material substrate having incorporated thereon at least about 0.001 weight percent of a water-soluble cellulose acetate polymeric constituent, said cellulose acetate polymeric constituent being characterized as having a degree of substitution of the acetyl moiety of from about 0.6 to about 0.9 and represented by the formula

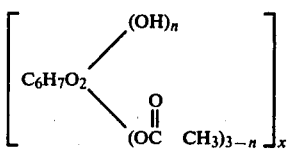

wherein x is an integer of at least about 50, n is an integer of from about 2.4 to about 2.1 and the expression 3−n is the degree of substitution of the acetyl moiety.

12. The textile material according to claim 11 wherein said water-soluble cellulose acetate polymeric constituent is employed in an amount of from about 0.01 to about 10 weight percent and x of the formula is from about 100 to about 200.

13. The textile material according to claim 12 wherein said water-soluble cellulose acetate polymeric constituent is present on said substrate in an amount of from about 0.05 to 1 weight percent.

* * * * *